June 26, 1962　　　G. R. SCHULZ　　　3,040,593
TAPE RECORDER CAPSTAN DRIVE
Filed March 9, 1961　　　　　　　　　　2 Sheets-Sheet 1

INVENTOR.
GORDON R. SCHULZ
BY
　　　　ATTORNEYS.

June 26, 1962     G. R. SCHULZ     3,040,593
TAPE RECORDER CAPSTAN DRIVE
Filed March 9, 1961     2 Sheets-Sheet 2
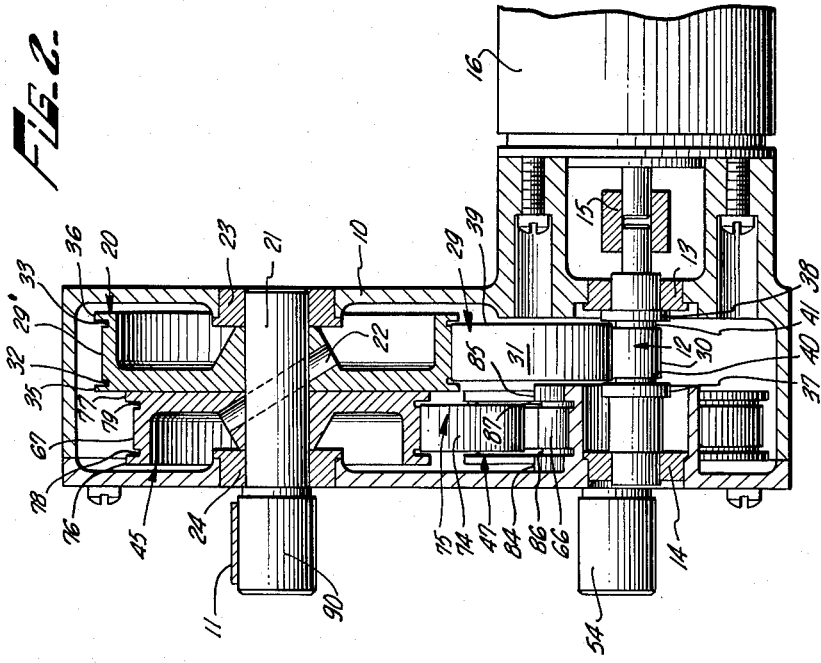
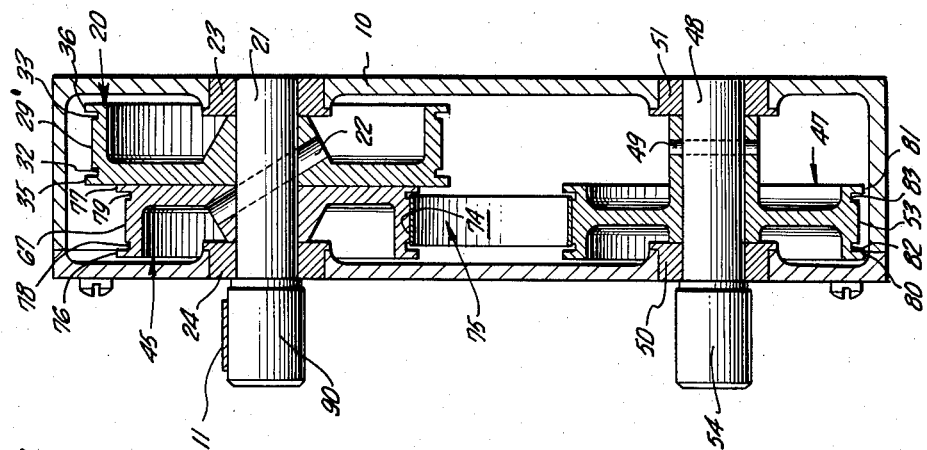
INVENTOR.
GORDON R. SCHULZ

United States Patent Office 3,040,593
Patented June 26, 1962

3,040,593
TAPE RECORDER CAPSTAN DRIVE
Gordon R. Schulz, Tujunga, Calif., assignor to Consolidated Electrodynamics Corporation, Pasadena, Calif., a corporation of California
Filed Mar. 9, 1961, Ser. No. 94,527
9 Claims. (Cl. 74—209)

The invention relates to apparatus for rotatively driving capstan heads of a tape recorder, and particularly to such apparatus wherein the drive is effected through frictional engagement of a rotatable resiliently compressed ring with circular drive and driven wheels.

Conventional belt and gear capstan drives exhibit several disadvantages. Gear drives present the problems of backlash in reversing the direction of drive, flutter, and the expense attendant upon precision manufacturing of such gears, particularly in miniaturized installations. Belt drives present the problems of slippage under temperature and humidity variations, reliability, belt life, and susceptibility to vibration.

The inventive apparatus obviates the above disadvantages and problems by providing a drive of high efficiency and reliability, low wear characteristics, minimal flutter, and proper operation over wide temperature ranges, large shock loads, and vibrational environments. The apparatus is simple, economical to manufacture, and exhibits low wear characteristics and silent operation. The invention apparatus provides the above advantages particularly in miniaturized drives wherein the above disadvantages of gear and belt drives are most apparent.

The invention apparatus comprises, broadly, a rotatably mounted circular drive wheel connected to means for rotatively driving the drive wheel, at least two rotatably mounted circular driven wheels spaced from each other and from the drive wheel with their planes of rotation coplanar with the plane of rotation of the drive wheel and with their axes of rotation spaced from each other and lying in a common plane spaced from the axis of rotation of the drive wheel. The axes of rotation of the driven wheels are located one on each side of the axis of rotation of the drive wheel. An annular normally circular resilient drive spring is rotatably disposed between the drive wheel and driven wheels for rotation in a plane coplanar with the plane of rotation of the drive wheel. The exterior peripheral surface of the drive spring engages the exterior peripheral surfaces of the drive wheel and driven wheels. Means is provided for resiliently displacing the drive spring in its plane of rotation radially inwardly toward its center of rotation to bias it into its above described engagements with the exterior surfaces of the drive wheel and driven wheels and effect a biased frictional engagement therewith. Means is also provided for maintaining the plane of rotation of the drive spring coplanar with the plane of rotation of the drive wheel. A cylindrical capstan drive head may be mounted on each of the driven wheels to be rotatively driven from the drive wheel through the drive spring.

The invention apparatus also includes the above arrangement wherein a track extends between the driven wheels with its exterior surface arcuate about the axis of rotation of the drive wheel and spaced from the exterior peripheral surface thereof. The drive spring is rotatably disposed in such manner that it rolls on the track to engagement with the exterior peripheral surface of one driven wheel responsive to rotation of the drive wheel in one direction and rolls on the track in the other direction to engagement with the exterior peripheral surface of the other driven wheel responsive to rotation of the drive wheel in the other direction, thereby effecting a reversing drive between the drive wheel and the driven wheels in which only one of the driven wheels is rotatively driven at a time by the drive spring and the driven wheels, when rotatively driven, are driven in opposite directions of rotation relative to each other responsive to opposite directions of rotation of the drive wheel.

The inventive apparatus will be fully understood from the following description of an embodiment thereof read in conjunction with the accompanying drawings, wherein:

FIG. 2 is a sectional view along the line 2—2 in FIG. 1;

FIG. 3 is a sectional view along the line 3—3 in FIG. 1; and

Figure 1:
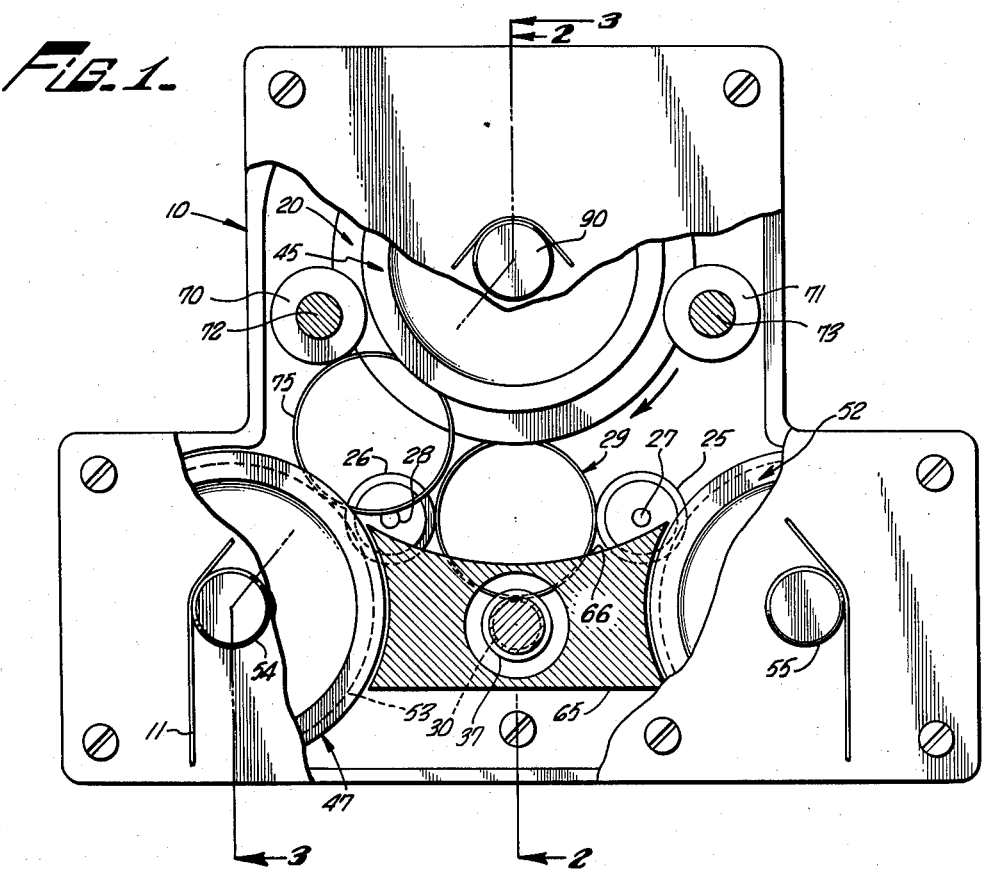
FIG. 1 illustrates a plan view partially broken away of an embodiment of the invention.

Referring to FIG. 1, 10 designates a housing containing drive mechanism for recording tape 11, which may be magnetic tape. As best shown in FIG. 2, a circular drive wheel 12 is rotatably mounted on housing 10 in bearings 13, 14. Drive wheel 12 is connected by means of a shaft and flywheel coupling 15 to an electric drive motor 16 which functions to rotatively drive wheel 12.

A circular first driven idler wheel 20 is fixed to shaft 21 by means of pin 22, and shaft 21 is rotatably mounted on the housing in bearings 23, 24. First idler wheel 20 is spaced from drive wheel 12 and its plane of rotation is coplanar with the plane of rotation of drive wheel 12. As best shown in FIG. 1, a pair of circular driven retaining wheels 25, 26 are rotatably mounted on the housing with stub axles 27, 28, respectively, fixed to housing 10. Retaining wheels 25, 26 are spaced from drive wheel 12 and idler wheel 20 with their planes of rotation coplanar with the plane of rotation of drive wheel 12 and with their axes of rotation intermediate the axes of rotation of drive wheel 12 and idler wheel 20 and spaced equally on opposite sides of a plane in which the axes of rotation of drive wheel 12 and idler wheel 20 lie. As illustrated, retaining wheels 25, 26 are each of the same diameter and their axes of rotation lie in a plane perpendicular to a plane in which the axes of rotation of drive wheel 12 and idler wheel 20 lie.

A first drive spring 29 is rotatably disposed between drive wheel 12, idler wheel 20, and retaining wheels 25, 26. Drive spring 29 is a right segment of a thin wall right cylindrical shell and is made of resilient material, such as spring steel, so that it may be resiliently deformed in its plane of rotation. As illustrated, the radial thickness of drive spring 29 is very small so that it is, in effect, a circular spring. The plane of rotation of drive spring 29 is coplanar with the plane of rotation of drive wheel 12, and the exterior peripheral surface 31 of drive spring 29 engages the exterior peripheral surfaces of drive wheel 12, idler wheel 20, and retaining wheels 25, 26, as illustrated. The exterior peripheral surfaces 29' and 30 of idler wheel 20 and drive wheel 12, respectively, are cylindrical and extend parallel to their axes of rotation to mate with the exterior peripheral surface 31 of drive spring 29. Drive spring 29 is resiliently displaced radially inwardly toward its center of rotation by means of the spacing between the exterior peripheral surfaces 30, 29 of drive wheel 12 and idler wheel 20, respectively, measured along a line passing through their axes of rotation, which spacing is less than the normal external diameter of drive spring 29 so that it is biased outwardly into its above described engagements with drive wheel 12 and idler wheel 20. As thus deformed, drive spring 29 in operative position is not circular but is generally ellipsoidal in shape, and retaining wheels 25, 26 are spaced accordingly to accommodate this ellipsoidal configuration of drive spring 29 as a result of the inward displacement thereof produced by the spacing of drive wheel 12 from idler wheel 20 described above. It is apparent that as drive wheel 12 is rotatively driven by motor 16, drive spring 29 frictionally engages the exterior peripheral surface 30 of drive wheel 12 and is rotatively driven to, in turn, rotatively drive idler wheel 20 through frictional engagement with its exterior peripheral surface 29′, drive spring 29 resiliently flexing as it rotates and being held in position by engagement with retaining wheels 25, 26 which have their exterior peripheral surfaces in engagement with the exterior peripheral surface 31 of drive spring 29 and rotate freely.

Idler wheel 20 has a pair of peripheral lips 35, 36 which are laterally spaced from each other in the direction of its axis of rotation and extend radially outwardly from the exterior peripheral surface 29′ of idler wheel 20. Lips 35, 36 each lie in separate planes which are parallel to each other and perpendicular to the axis of rotation of idler wheel 20. Idler wheel 20 defines a pair of circumferential recesses 32, 33 which are located one adjacent each lip 35, 36 between the lip and exterior circumferential surface 29. Drive wheel 12 has a similar pair of circumferential lips 37, 38 which extend radially outwardly from its exterior peripheral surface 30 with lips 37, 38 aligned with lips 35, 36, respectively, on idler wheel 20. Drive wheel 12 also has a pair of circumferential recesses 40, 41 which are disposed one adjacent each lip 37, 38 between the lip and circumferential surface 30. Lips 35, 36 and 37, 38 function as means to maintain the plane of rotation of drive spring 29 coplanar with the plane of rotation of drive wheel 12 and idler wheel 20. A small clearance is provided between the radial ends of drive spring 29, such as end 39, and the lips in order to prevent binding or undue friction.

A second idler wheel 45 is fixed to shaft 21 by pin 22 for rotation in a plane parallel to but spaced from the plane of rotation of first idler wheel 20. Pin 22 extends through both idler wheel 20, idler wheel 45, and shaft 21 in order to connect together the two idler wheels for rotation as a single unit with a common axis of rotation.

A first driven capstan wheel 47 is fixed to a shaft 48 by means of a pin 49 (FIG. 3), and shaft 48 is rotatably mounted on housing 10 by means of bearings 50, 51. In similar fashion, a second capstan wheel 52 is fixed to a shaft which is rotatably mounted on housing 10 by means of bearings to rotatably mount second capstan wheel 52 on housing 10. First and second capstan wheels 47, 52 are identical in all respects. First and second capstan wheels 47, 52 are spaced from each other and are each spaced equally from idler wheel 45 with their planes of rotation lying in the plane of rotation of idler wheel 45 and with their axes of rotation lying in a common plane spaced from the axis of rotation of idler wheel 45. Each capstan wheel 47, 52 has a cylindrical exterior peripheral surface, such as the surface 53 for first capstan wheel 47, of the same diameter. The shafts to which first and second capstan wheels 47, 52 are fixed each extend exteriorly of housing 10 on the same side thereof and have fixed to their extensions identical cylindrical capstan heads 54 and 55, respectively, about which recording tape 11 is transported. A track 65 is fixed to housing 10 and extends between the exterior peripheral surfaces of first and second capstan wheels 47, 52. The exterior surface 66 of track 65 is arcuate about the axis of rotation of idler wheel 45 and is uniformly spaced from the exterior peripheral surface 67 of idler wheel 45 the same amount as the equal spacing of the exterior peripheral surfaces of the first and second capstan wheels, such as surface 53 of first capstan wheel 47, from the exterior peripheral surface 67 of idler wheel 45.

First and second circular stop wheels 70, 71 are rotatably mounted on stub shafts 72, 73, respectively, fixed to housing 10 so that stop wheels 70, 71 are rotatably mounted on housing 10. First stop wheel 70 is spaced from first capstan wheel 47 and from idler wheel 45 with its plane of rotation coplanar with the plane of rotation of idler wheel 45 and with its axis of rotation spaced from a plane in which the axes of rotation of first capstan wheel 47 and idler wheel 45 lie on the side of such plane remote from second capstan wheel 52. Similarly, second stop wheel 71 is spaced from second capstan wheel 52 and from idler wheel 45 with its plane of rotation coplanar with the plane of rotation of idler wheel 45 and with its axis of rotation spaced from a plane in which the axes of rotation of second capstan wheel 52 and idler wheel 45 lie on the side of such plane remote from first capstan wheel 47.

A second drive spring 75 is rotatably disposed between idler wheel 45 and first and second capstan wheels 47, 52 and track 65. Drive spring 75 may have different dimensions than drive spring 29 but otherwise is identical to drive spring 29 in geometry, material and function, and accordingly will not be described in detail. The exterior peripheral surfaces of idler wheel 45 and first and second capstan wheels 47, 52 mate with the exterior peripheral surface of drive spring 75 in the manner described above for drive spring 29. The minimum spacing between the exterior peripheral surface 53 of first capstan wheel 47 and the exterior peripheral surface 67 of idler wheel 45 is slightly less than the normal external diameter of drive spring 75 in order to displace drive spring 75 radially inwardly toward its center and thus effect biased frictional engagement between the exterior peripheral surface 74 of drive spring 75 and the exterior peripheral surfaces 53, 67 of first capstan wheel 47 and idler wheel 45, respectively. The spacing of exterior surface 66 of track 65 from exterior peripheral surface 67 of idler wheel 45 and the minimum spacing of the exterior peripheral surface of second capstan wheel 52 from exterior peripheral surface 67 of idler wheel 45 are each equal to the minimum spacing described above of exterior peripheral surface 53 of first capstan wheel 47 from exterior peripheral surface 67 of idler wheel 45 and perform the same function described above therefor. The minimum spacing between the exterior peripheral surfaces of first and second capstan wheels 47, 52 is greater than the normal external diameter of drive spring 75. First and second stop wheels 70, 71 are located so that the approximate center of rotation of drive spring 75 is unable to move past a line connecting the axis of rotation of idler wheel 45 and the axis of rotation of whichever capstan wheel the stop roller is most closely associated with. It is apparent that rotation of idler wheel 45 in one direction will cause drive spring 75 to roll in that direction until it engages a stop wheel, at which point it also engages the exterior peripheral surface of the capstan wheel associated with that stop wheel and rotates in position to rotatively drive the capstan wheel which is frictionally engages. As illustrated in FIG. 1, the rotation of idler wheel 45 is in a clockwise direction and has caused drive spring 75 to roll to the extreme left to engage first stop wheel 70 and first capstan wheel 47 and drive it in a clockwise direction. Upon reversal of the direction of rotation of idler wheel 45, drive spring 75 will be caused to roll to the extreme right and engage second stop wheel 71 and the exterior peripheral surface of second capstan wheel 52 to rotatively drive second capstan wheel 52 in a counterclockwise direction. The operation of drive spring 75 in effecting a drive with first and second capstan wheels is generally the same as that described above for drive spring 29 in that due to the radial inward displacement of drive spring 75 it rotates in a generally ellipsoidal pattern and is biased outwardly into its frictional engagements described above. It is apparent that the external diameters of drive wheel 12, first and second idler wheels 20 and 45, first and second capstan wheels 47 and 52, and first and second drive springs 29 and 75 may all be designed in relation to each other to effect any speed reduction desired, and such diameters of first and second capstan wheels 47 and 52 may be different for different speeds forward and in reverse.

Idler wheel 45 carries a pair of circumferential flanges 76, 77 which are spaced from each other in the direction of its axis of rotation and extend radially outwardly from its exterior peripheral surface 67. Idler wheel 45 also defines a pair of circumferential recesses 78, 79 in its exterior peripheral surface 67 which are located one adjacent lip 76 and the other adjacent lip 77 to separate such lips from surface 67. In similar manner, first capstan wheel 47 carries a pair of circumferential lips 80, 81 which extend radially outwardly from its exterior peripheral surface 53. Lips 80, 81 are aligned with lips 76, 77, respectively, on idler wheel 45. First capstan wheel 47 also defines a pair of circumferential recesses 82, 83, one adjacent each lip 80, 81, and disposed between the lip and its exterior peripheral surface 53. Drive spring 75 is disposed between the aligned lips on idler wheel 45 and first capstan wheel 47 with slight clearance between its radial ends and the lips to prevent binding and undue friction as described above in connection with drive spring 29. Second capstan wheel 52 is identical to first capstan wheel 47 with respect to the above described lips and recesses 80, 81, 82 and 83, and accordingly will not be described in detail. The above described aligned lips on idler wheel 45 and the first and second capstan wheels serve as means to maintain the plane of rotation of second drive spring 75 coplanar with the plane of rotation of idler wheel 45. In addition, similar lips 84, 85 are provided on track 65 and extend from exterior surface 66 thereof upwardly toward idler wheel 45. Lips 84, 85 are aligned with lips 76, 77, respectively, on idler wheel 45, and serve to maintain the plane of rotation of drive spring 75 coplanar with the plane of rotation of idler wheel 45 during the time that drive spring 75 engages exterior surface 66 of track 65. In addition, track 65 has a pair of grooves 86, 87 which are coextensive with its arcuate surface 66 and located one adjacent each lip 84, 85 separating that lip from surface 66.

A cylindrical capstan head 90 is fixed to shaft 21 and is aligned with capstan heads 54, 55. Recording tape 11, as described above, passes over capstan heads 54 and 55 and extends up over capstan head 90. It is apparent from the above that the apparatus shown in FIGS. 1, 2, 3 constitutes a reduction drive through drive spring 29 and a reversing drive through drive spring 75. Depending on the direction of rotation of drive wheel 12 and hence of idler wheel 45, one of the capstan wheels is driven in the same direction of rotation as idler wheel 45 and the two capstan wheels rotate in opposite directions relative to each other when they are driven.

Figure 4:
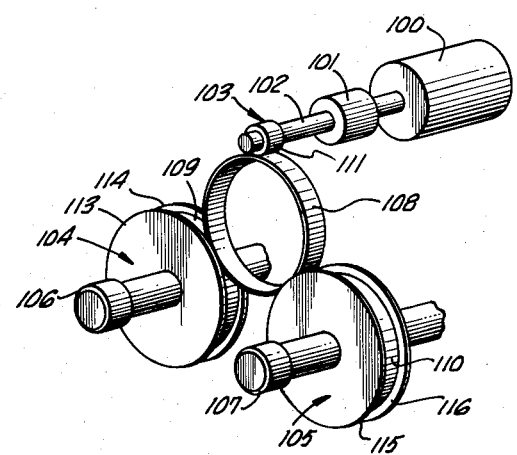
FIG. 4 is a perspective schematic view of another embodiment of the invention.

FIG. 4 is a schematic illustration of a direct capstan drive. In FIG. 4, 100 represents an electric drive motor connected through flywheel coupling 101 to a shaft 102 to which is fixed a circular drive wheel 103. First and second capstan wheels 104 and 105 are rotatably mounted in bearings and have fixed thereto for rotation in unison therewith capstan heads 106, 107, respectively, which engage magnetic tape and transport it. First and second capstan wheels 104, 105 are spaced from each other and from drive wheel 103 with their planes of rotation coplanar with the plane of rotation of drive wheel 103 and with their axes equally spaced from the axis of rotation of drive wheel 103 and lying in a common plane spaced from such axis of rotation of drive wheel 103. Rotatably disposed between first and second capstan wheels 104, 105 and drive wheel 103 is a drive spring 108. Drive spring 108 is identical in geometry, material and function to the above described drive spring 29 and hence will not be described in detail. The exterior circumferential surface of drive spring 108 engages exterior circumferential surfaces 109 and 110 of first and second capstan wheels 104, 105, respectively, and also engages exterior peripheral surface 111 of drive wheel 103. The spacing of first and second capstan wheels 104, 105 is such that drive spring 108, although normally circular, is resiliently displaced radially inwardly to effect biased frictional engagement with the exterior peripheral surfaces of the first and second capstan wheels and the drive wheel. As thus displaced, drive spring 108 rotates in place and during rotation flexes resiliently in a generally ellipsoidal pattern, effecting frictional drive with first and second capstan wheels 104, 105 and driving them in the same directions of rotation. Means is provided to maintain the plane of rotation of drive spring 108 coplanar with the plane of rotation of drive wheel 103, this taking the form of lips 113 and 114 extending around the circumference of first capstan wheel 104 and which extend radially outwardly from its exterior peripheral surface 109, and corresponding aligned lips 115, 116 extending around the circumference of second capstan wheel 105 and extending radially outwardly from its exterior peripheral surface 110. Similar lips may be provided if desired on drive wheel 103. Drive spring 108 is disposed between lips 113, 114, 115, and 116 with slight clearance to avoid binding and is thereby maintained with its plane of rotation coplanar with the plane of rotation of drive wheel 103. It is to be understood that the exterior peripheral surfaces 109, 110 of the first and second capstan wheels are the same diameter and are spaced the same distance from surface 111 of drive wheel 103.

I claim:

1. In a tape recorder capstan drive, a rotatably mounted circular drive wheel, means for rotatively driving the drive wheel, at least two rotatably mounted circular driven wheels spaced from each other and from the drive wheel with their planes of rotation coplanar with the plane of rotation of the drive wheel and with their axes of rotation spaced from each other and lying in a common plane spaced from the axis of rotation of the drive wheel, the axes of rotation of the driven wheels being located one on each side of the axis of rotation of the drive wheel, an annular normally circular resilient drive spring rotatably disposed between the drive wheel and the driven wheels for rotation in a plane coplanar with the plane of rotation of the drive wheel and driven wheels, the distance between the peripheries of each driven wheel and the periphery of the drive wheel being less than the normal relaxed diameter of the drive spring, the exterior peripheral surface of the drive spring engaging the exterior peripheral surfaces of the drive wheel and one of the driven wheels, means for guiding the drive spring in its plane of rotation during movement between its engagements with the exterior surfaces of the drive wheel and driven wheels whereby a biased frictional engagement therebetween is maintained, and means for maintaining the plane of rotation of the drive spring coplanar with the plane of rotation of the drive wheel and driven wheels.

2. In a tape recorder capstan drive, a rotatably mounted circular drive wheel, means for rotatively driving the drive wheel, at least two rotatably mounted circular driven wheels spaced from each other and from the drive wheel with their planes of rotation coplanar with the plane of rotation of the drive wheel and with their axes of rotation spaced from each other and lying in a common plane spaced from the axis of rotation of the drive wheel, the axes of rotation of the driven wheels being located one on each side of the axis of rotation of the drive wheel, an annular normally circular resilient drive spring rotatably disposed between the drive wheel and the driven wheels for rotation in a plane coplanar with the plane of rotation of the drive wheel and driven wheels, the exterior peripheral surface of the drive spring engaging the exterior peripheral surfaces of the drive wheel and the driven wheels, said drive spring being a right segment of a thin wall right cylindrical shell, the distance between the peripheries of each driven wheel and the periphery of the drive wheel being less than the normal relaxed diameter of the drive spring, means for guiding the drive spring in its plane of rotation peripherally of the drive wheel into its engagements with the exterior surfaces of the drive wheel and driven wheels and for maintaining a biased frictional engagement therebetween, and means for maintaining the plane of rotation of the drive spring coplanar with the plane of rotation of the drive wheel and driven wheels.

3. Apparatus in accordance with claim 2 wherein the means for maintaining the plane of rotation of the drive spring coplanar with the plane of rotation of the drive wheel and driven wheels comprises a pair of axially spaced peripheral flanges extending radially outwardly from the exterior peripheral surface of at least one of the drive and driven wheels, and the drive spring being disposed between the flanges in spaced relation therefrom.

4. Apparatus in accordance with claim 3 wherein the minimum spacing of the exterior peripheral surfaces of each of the driven wheels from the exterior peripheral surfaces of the drive wheel is the same.

5. A tape recorder capstan drive comprising a housing, a circular drive wheel rotatably mounted on the housing, means for rotatably driving the drive wheel, a circular driven first idler wheel rotatably mounted on the housing in spaced relation from the drive wheel with its plane of rotation coplanar with the plane of rotation of the drive wheel, at least one circular driven retaining wheel rotatably mounted on the housing in spaced relation from the drive wheel and from the first idler wheel with its plane of rotation coplanar with the plane of rotation of the drive wheel and its axis of rotation intermediate the axes of rotation of the drive wheel and first idler wheel and spaced from a common plane in which the axes of rotation of the drive wheel and first idler wheel lie, an annular normally circular resilient first drive spring rotatably disposed between the drive wheel, first idler wheel and retaining wheels with its plane of rotation coplanar with the plane of rotation of the drive wheel and with its exterior peripheral surface in resiliently compressed engagement with the exterior peripheral surfaces of the drive wheel and the first idler wheel, the distance between the peripheral surfaces of the drive wheel and the first idler wheel being less than the normal external diameter of the first drive spring to resiliently bias the exterior peripheral surface of the first drive spring into its engagements with the exterior peripheral surfaces of the drive wheel and the first idler wheel and retaining wheels, means for maintaining the plane of rotation of the first drive spring coplanar with the plane of rotation of the drive wheel, a circular driven second idler wheel rotatably mounted on the housing with its axis of rotation coaxial with the axis of rotation of the first idler wheel and with its plane of rotation spaced from and parallel to the plane of rotation of the first idler wheel, means for connecting the first idler wheel and the second idler wheel together for rotation as a unit, first and second circular driven capstan wheels rotatably mounted on the housing and spaced from each other and from the second idler wheel with their planes of rotation coplanar with the plane of rotation of the second idler wheel and with their axes of rotation lying in a common plane spaced from the axis of rotation of the second idler wheel and disposed one on each side of the axis of rotation of the second idler wheel, a cylindrical capstan drive head mounted on each of the first and second capstan wheels for rotation therewith, a track extending between the exterior peripheral surfaces of the first and second capstan wheels with its exterior surface arcuate about the axis of rotation of the second idler wheel and spaced from the exterior peripheral surface thereof, first and second circular stop wheels rotatably mounted on the housing for rotation in the plane of rotation of the second idler wheel, the first stop wheel being spaced from the second idler wheel and from the first capstan wheel with its axis of rotation spaced from a plane in which the axes of rotation of the second idler wheel and the first capstan wheel lie on the side of the plane remote from the axis of rotation of the second capstan wheel, the second stop wheel being spaced from the second idler wheel and from the second capstan wheel with its axis of rotation spaced from a plane in which the axes of rotation of the second idler wheel and the second capstan wheel lie on the side of the plane remote from the axis of rotation of the first capstan wheel, a second annular normally circular resilient drive spring rotatably disposed between the second idler wheel and the first and second capstan wheels and the track extending therebetween, the distance between the second idler wheel and the first and second capstan wheels and the track being less than the normal external diameter of the second drive spring, the exterior peripheral surface of the second drive spring engaging the exterior peripheral surfaces of the second idler wheel and first capstan wheel and first stop wheel for resiliently spaced frictional drive of the first capstan wheel responsive to rotation of the second idler wheel in one direction and engaging the exterior peripheral surfaces of the second idler wheel and second capstan wheel and second stop wheel for resiliently biased frictional drive of the second capstan wheel responsive to rotation of the second idler wheel in the other direction.

6. Apparatus in accordance with claim 5 wherein the minimum spacing of the exterior peripheral surfaces of the first and second capstan wheels from the exterior peripheral surface of the second idler wheel is the same, the spacing of the arcuate exterior surface of the track from the exterior peripheral surface of the second idler wheel is constant and equal to the minimum spacing of the exterior peripheral surfaces of the first and second capstan wheels from the exterior peripheral surface of the second idler wheel, and the minimum spacing between the exterior peripheral surfaces of the first and second capstan wheels is greater than the normal diameter of the exterior peripheral surface of the second drive spring.

7. A tape recorder capstan drive comprising a housing, a circular drive wheel rotatably mounted on the housing, means for rotatively driving the drive wheel, first and second circular driven capstan wheels rotatably mounted on the housing and spaced from each other and from the drive wheel with their planes of rotation coplanar with the plane of rotation of the drive wheel and with their axes of rotation lying in a common plane spaced from the axis of rotation of the drive wheel and disposed one on each side of the axis of rotation of the drive wheel, a cylindrical capstan drive head mounted on each of the first and second capstan wheels for rotation therewith, a track extending between the exterior peripheral surfaces of the first and second capstan wheels with its exterior surface arcuate about the axis of rotation of the drive wheel and spaced from the exterior peripheral surface thereof, first and second circular stop wheels rotatably mounted on the housing for rotation in the plane of rotation of the drive wheel, the first stop wheel being spaced from the drive wheel and from the first capstan wheel with its axis of rotation spaced from a plane in which the axes of rotation of the drive wheel and the first capstan wheel lie on the side of the plane remote from the axis of rotation of the second capstan wheel, the second stop wheel being spaced from the drive wheel and from the second capstan wheel with its axis of rotation spaced from a plane in which the axes of rotation of the drive wheel and the second capstan wheel lie on the side of the plane remote from the axis of rotation of the first capstan wheel, an annular normally circular resilient drive spring rotatably disposed between the drive wheel and the first and second capstan wheels and the track extending therebetween, the distance between the drive wheel and the first and second capstan wheels and the track being less than the normal external diameter of the drive spring, the exterior peripheral surface of the drive spring engaging the exterior peripheral surfaces of the drive wheel and first capstan wheel and first stop wheel for resiliently biased frictional drive of the first capstan wheel responsive to rotation of the drive wheel in one direction and engaging the exterior peripheral surfaces of the drive wheel and second capstan wheel and second stop wheel for resiliently biased frictional drive of the second capstan wheel responsive to rotation of the drive wheel in the other direction.

8. Apparatus in accordance with claim 7 wherein the minimum spacing of the exterior peripheral surfaces of the first and second capstan wheels from the exterior peripheral surface of the drive wheel is the same, the spacing of the arcuate exterior surface of the track from the exterior peripheral surface of the drive wheel is constant and equal to the minimum spacing of the exterior peripheral surfaces of the first and second capstan wheels from the exterior peripheral surface of the drive wheel, and the minimum spacing between the exterior peripheral surfaces of the first and second capstan wheels is greater than the normal diameter of the exterior peripheral surface of the drive spring.

9. Apparatus in accordance with claim 7 wherein the drive spring is a right segment of a thin wall right cylindrical shell, and including means for maintaining the plane of rotation of the drive spring coplanar with the plane of rotation of the drive wheel comprising a pair of axially spaced peripheral flanges extending radially outwardly from the exterior peripheral surfaces of a plurality of the drive wheel and first and second capstan wheels, the corresponding flanges on different wheels being aligned, and the drive spring being disposed between the flanges in spaced relation therefrom.

References Cited in the file of this patent

UNITED STATES PATENTS

| | | |
|---|---|---|
| 363,859 | Stoddard | May 31, 1887 |
| 663,130 | Feeny | Sept. 19, 1899 |
| 690,884 | Silvestri | Jan. 7, 1902 |
| 2,716,349 | Nisenson | Aug. 3, 1955 |

UNITED STATES PATENT OFFICE
CERTIFICATE OF CORRECTION

Patent No. 3,040,593            June 26, 1962

Gordon R. Schulz

It is hereby certified that error appears in the above numbered patent requiring correction and that the said Letters Patent should read as corrected below.

Column 1, lines 29, 32, and 59, for "invention", each occurrence, read -- inventive --; column 4, line 48, for "is" read -- in --; line 53, for "is" read -- it --.

Signed and sealed this 30th day of October 1962.

(SEAL)
Attest:

ERNEST W. SWIDER
Attesting Officer

DAVID L. LADD
Commissioner of Patents